United States Patent [19]

Uemura

[11] 3,930,268

[45] Dec. 30, 1975

[54] CASSETTE TAPE DECK WITH BRAKE AND TAPE TENSIONING MEANS

[75] Inventor: Yasuhiro Uemura, Tokyo, Japan

[73] Assignee: Teac Corporation, Musashino, Japan

[22] Filed: May 6, 1974

[21] Appl. No.: 466,955

Related U.S. Application Data

[62] Division of Ser. No. 263,969, June 19, 1972, Pat. No. 3,864,744.

[30] Foreign Application Priority Data

June 20, 1971 Japan .............................. 46-44082
June 20, 1971 Japan .............................. 46-44083
June 20, 1971 Japan .............................. 46-44084

[52] U.S. Cl. .................................. 360/96; 242/204
[51] Int. Cl.$^2$ .................... G11B 15/18; B65H 23/06
[58] Field of Search ........ 360/96, 93, 105; 242/204, 242/201, 202; 226/168

[56] References Cited

UNITED STATES PATENTS

| | | | |
|---|---|---|---|
| 3,448,940 | 6/1969 | Atsumi | 242/204 |
| 3,488,058 | 1/1970 | Staar | 360/96 |
| 3,533,633 | 10/1970 | Wilder | 242/201 |
| 3,610,553 | 10/1971 | Matsuyama | 242/201 |
| 3,620,479 | 11/1971 | Umeda | 360/93 |
| 3,664,672 | 5/1972 | Fujikawa et al. | 360/105 |
| 3,667,701 | 6/1972 | Blum | 360/96 |
| 3,670,992 | 6/1972 | Goshima et al. | 242/204 |
| 3,695,549 | 10/1972 | Von Hornstein et al. | 242/204 |

*Primary Examiner*—Bernard Konick
*Assistant Examiner*—David K. Moore
*Attorney, Agent, or Firm*—Marshall & Yeasting

[57] ABSTRACT

A cassette tape deck for use with a tape cassette having a magnetic tape wound on reels in a casing, which is designed to record signals on the tape or reproduce them therefrom based upon loading of the cassette, and in which at least one guide pin having slidably mounted thereon a sliding member biased toward the upper end of the guide pin and the sliding member has formed therein a groove or aperture extending perpendicular to the sliding direction thereof and has associated therewith a movable member biased toward the guide pin, whereby when the cassette has been loaded on the tape deck at a predetermined position, the groove or aperture of the sliding member receives the movable member to detect the loading of the cassette at the predetermined position and actuation of tape driving means is allowed based upon the detection of the loading of the cassette; in which left and right braking members attached to a lever associated with left and right actuating levers for urging left and right pinch rollers into rotary contact with left and right capstans with the tape being gripped therebetween respectively and for pressing the magnetic head against the tape is selectively brought into contact with left and right wheels mounted on left and right reel shafts, whereby the tape is driven across the magnetic head while being subjected to required back tension; and in which the tape is driven to the right (or left) under such conditions that left and right pinch rollers are held in rotary contact with left and right capstans with the tape being gripped therebetween respectively and the contact pressure of the left (or right) pinch roller to the left (or right) capstan is held lower than that of the right (or left) pinch roller to the right (or left) capstan, whereby the tape is driven across the magnetic head while being subjected to required back tension.

1 Claim, 5 Drawing Figures

CASSETTE TAPE DECK WITH BRAKE AND TAPE TENSIONING MEANS

CROSS-REFERENCE TO RELATED APPLICATION

This application is a division of application Ser. No. 263,969, filed June 19, 1972, and now U.S. Pat. No. 3,864,744.

BACKGROUND OF THE INVENTION

1. Field of the Invention

This invention relates to improvements in a cassette tape deck on which is loaded a cassette such that a magnetic tape wound on reels having central apertures respectively is housed in a casing having a first major face or faces having formed therein at least capstan receiving apertures, reel drive shaft receiving apertures and guide pin receiving holes and a second major face having formed therein at least a magnetic head receiving window and pinch roller receiving windows and substantially perpendicular to the first major face or faces and which is designed so that signals are recorded on the tape or reproduced therefrom based upon the loading of the cassette.

2. Description of the Prior Art

In conventional types of cassette tape decks, even if the cassette is not loaded in position, driving means such as capstans, reel shafts and so on can be actuated. This introduces the possibilities that when the driving means are actuated after the cassette has been loaded on the deck, the tape in the cassette is not driven normally and that even if the deck is put, for example, in a recording mode of operation after the cassette has been loaded on the deck, no signal is recorded on the tape when the cassette is not loaded on the deck in position. Further, the prior cassette tape decks employ complicated means for driving the tape across the magnetic head while applying required tension to the tape.

SUMMARY OF THE INVENTION

Accordingly, one object of this invention is to provide a cassette tape deck which is adapted such that only when the cassette is loaded on the deck at a predetermined position tape driving means are permitted to be actuated. According to this invention, at least one guide pin for guiding the cassette to load it on the tape deck has slidably mounted thereon a sliding member which is biased toward the upper end of the guidepin and the sliding member has formed therein a groove or an aperture extending perpendicular to the sliding direction thereof and has associated therewith a movable member biased toward the guide pin. When the cassette has been loaded on the tape deck at a predetermined position, the groove or aperture of the sliding member reaches the position of the movable member to receive it to detect the loading of the cassette in position and actuation of the tape driving means is allowed based on the detection.

Another object of this invention is to provide simple means for use in this kind of cassette tape decks by which the tape is driven across the magnetic head while being subjected to required back tension. One example of the means of this invention is such that left and right braking members attached to a lever associated with left and right actuating levers for urging left and right pinch rollers into rotary contact with left and right capstans with the tape being gripped therebetween respectively and for pressing the magnetic head against the tape are selectively brought into contact with left and right wheels mounted on left and right reel shafts. With another example of this means, the tape is driven to the right (or left) under such conditions that left and right pinch rollers are held in rotary contact with left and right capstans with the tape being gripped therebetween respectively and the contact pressure of the left (or right) pinch roller to the left (or right) capstan is held lower than that of the right (or left) pinch roller to the right (or left) capstan.

Other objects, features and advantages of this invention will become apparent from the following description taken in conjunction with the accompanying drawings.

DESCRIPTION OF THE PREFERRED EMBODIMENTS

Figure 1:
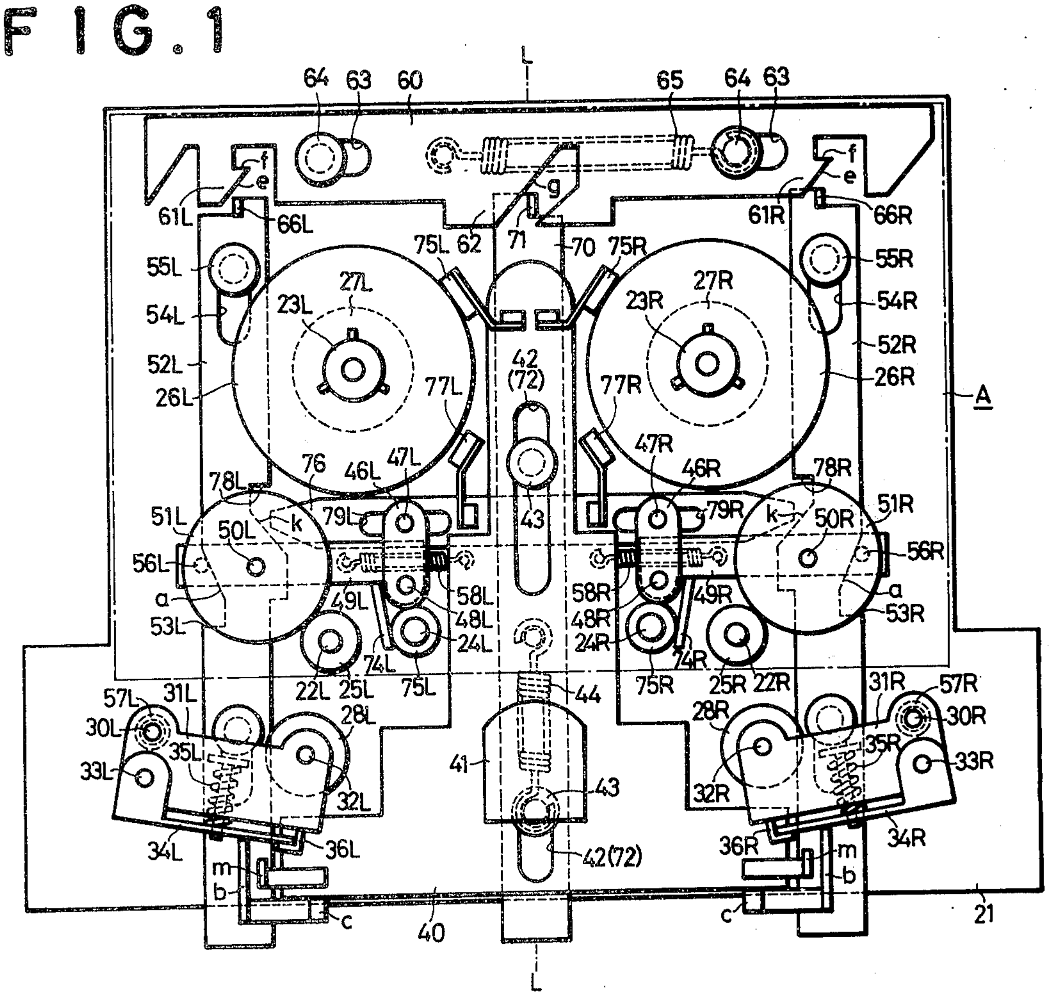
FIG. 1 is a plan view schematically showing one example of a cassette tape deck produced according to this invention.
Figure 2A:
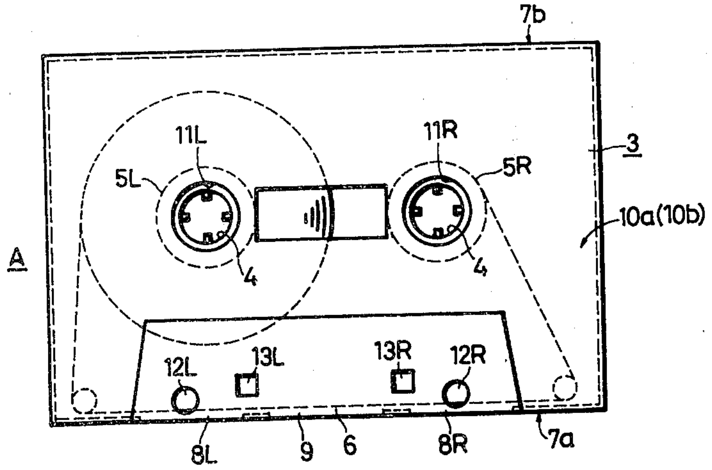
FIGS. 2A and 2B are plan and front views of a cassette usable in this invention respectively.
Figure 2B:
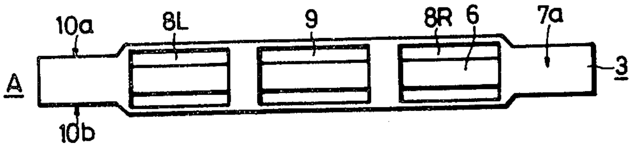

With reference to the drawings a detailed description will be given of one example of this invention. In FIG. 1 reference character M indicates generally a cassette tape deck of this invention, on which a cassette A is loaded as indicated by a chain line. As will be apparent from FIGS. 2A and 2B, the cassette A has the construction of the so-called philips cassette such that reels 5L and 5R having centrally disposed apertures 4 respectively are disposed in a casing 3; a magnetic tape 6 is stretched between the reels 5L and 5R across a left pinch roller receiving window 8L, a magnetic head receiving window 9 and a right pinch roller receiving window 8R formed in the front 7*a* of the casing 3 and sequentially arranged in that order from left to right; left and right apertures 11L and 11R are formed in the top and bottom members 10*a* and 10*b* of the casing 3 in alignment with the central apertures 4 of the left and right reels 5L and 5R respectively; left and right capstan receiving holes 12L and 12R are formed in the top and bottom members 10*a* and 10*b* of the casing 3 at the forward portion thereof at places corresponding to the pinch roller receiving windows 8L and 8R respectively; and holes 13L and 13R for receiving left and right guide pins are formed in the top and bottom members 10*a* and 10*b* of the casing 3 at the forward portion thereof at corresponding places between the pinch roller receiving windows 8L and 8R and the magnetic head receiving window 9 respectively.

The cassette tape deck M has a chassis 21, on which there are disposed symmetrically on both sides of a central line L—L capstans 22L and 22R, reel drive shafts 23L and 23R and guide pins 24L and 24R. In this case, the capstans 22L and 22R have attached thereto capstan wheels 25L and 25R respectively, which are coupled with a drive source (not shown) provided under the chassis 21, and further, the reel drive shafts 23L and 23R have coupled therewith wheels 26L and 26R through rotary frictional coupling means 27L and 27R respectively. The relative arrangements of these capstans 22L and 22R, the reel drive shafts 23L and 23R and the guide pins 24L and 24R are the same as those of the capstan receiving apertures 12L and 12R, the reel drive shaft receiving apertures 11L and 11R and the guide pin receiving holes 13L and 13R of the cassette A. At the forward portion of the chassis 21 pinch rollers 28L and 28R are disposed bilaterally on both sides of the central line L—L but these pinch rollers 28L and 28R are pivoted to pins 32L and 32R on the free ends of rotary arms 31L and 31R journalled to shafts 30L and 30R respectively. While, the rotary arms 31L and 31R have pivoted thereto rotary arms 34L and 34R by means of pins 33L and 33R respectively and springs 35L and 35R are interposed between the arms 34L, 34R and 31L, 31R respectively to bias the arms 34L and 34R clockwise and anticlockwise relative to the arms 31L and 31R respectively, and their rotational biased positions are defined by engaging pieces 36L and 36R attached to the arms 31L and 31R respectively. By pressing back the arms 34L and 34R, the arms 31L and 31R are turned anticlockwise and clockwise about the pins 30L and 30R through the springs 35L and 35R respectively to bring the pinch rollers 28L and 28R into rotary contact with the capstans 22L and 22R respectively. Further, a sliding plate 40 is disposed on the chassis 21 which is adapted to be slidable back and forth on the central line L—L and a magnetic head 41 is mounted by suitable means (not shown) on the sliding plate 40 at its forward portion. Reference numeral 42 designates an elongated sliding plate guide hole bored in the plate 40 and 43 a guide pin loosely fitted therein. In this case, a spring 44 is interposed between the plate 40 and the chassis 21, for example, between the plate 40 and the pin 43, by which the plate 40 is biased forwardly.

Since the construction above described is employed in conventional cassette tape devices, no further detailed description will be given. However, as will be apparent from FIGS. 1 and 3, arms 46L and 46R are pivoted to the chassis 21 by means of pins 47L and 47R at symmetrical positions on both sides of the central line L—L, while arms 49L and 49R are pivoted to the free ends of the arms 46L and 46R by means of pins 48L and 48R respectively. Further, idlers 51L and 51R are pivoted to the free ends of the arms 49L and 49R by means of pins 50L and 50R and pins 56L and 56R are also planted on these free ends respectively. On the chassis 21 there are arranged at symmetrical positions on both sides of the central line L—L actuating levers 52L and 52R for playing which are slidable back and forth, and the left and right sides of the actuating levers 52L and 52R have formed therein notches 53L and 53R having forwardly and in wardly inclined portions *a* respectively. Further, the forward portions of the actuating levers 52L and 52R have respectively carried thereon actuating pieces *b* for abuttment with the aforementioned rotary arms 34L and 34R associated with the pinch roller arms 31L and 31R and actuating pieces *c* for abuttment with the front end face of the aforesaid sliding plate 40. Reference numerals 54L and 54R designate elongated guide holes formed in the actuating levers 52L and 52R respectively and 55L and 55R guide pins planted on the chassis 21 and loosely inserted in the elongated holes 54L and 54R respectively.

Assuming that, at a position where the sliding plate 40 is forwardly biased by the spring 44, the actuating levers 52L and 52R are forwardly biased through their actuating pieces *c* respectively and that the rotary arms 31L and 31R for the pinch rollers are biased clockwise and anticlockwise by coiled springs 57L and 57R wound on the shafts 30L and 30R respectively, their biased rotational positions are defined by abuttment of the arms 34L and 34R with the actuating pieces *b* of the actuating levers 52L and 52R. At the biased rotational positions thus defined, the pinch rollers 28L and 28R stay out of engagement with the capstans 22L and 22R respectively. Further, assuming that when the actuating levers 52L and 52R lie in their forwardly biased positions, the aforementioned arms 49L and 49R are biased to the right and left relative to the chassis 21 respectively by springs 58L and 58R interposed between arms 49L, 49R and the chassis 21, the pins 56L and 56R make contact with the left and right sides of the actuating levers 52L and 52R rearwardly of the notches 53L and 53R respectively to hold the idlers 51L and 51R in or out of rotary contact with the wheels 25L and 25R respectively but the positions of the idlers 51L and 51R in this case are defined so that they are out of contact with at least the wheels 26L and 26R.

At the backward portion of the chassis 21 there is disposed a locking lever 60 which is slidable to the left and right and whose left and right side portions have hooked pieces 61L and 61R each having an inclined face *e* backwardly inclined to the right and a face *f* extending from its rear free end to the left and whose central portion has an engaging piece 62 having an inclined face *g* backwardly inclined to the right. Reference numeral 63 indicates an elongated guide hole bored in the locking piece 60 and 64 a guide pin planted on the chassis 21 and loosely inserted in the elongated guide hole 63. In this case, a spring 65 is interposed between the locking lever 60 and the chassis 21, for example, between the lever 60 and the pin 64, thereby biasing the lever 60 to the right. While, the rear free ends of the aforesaid actuating levers 52L and 52R have formed thereon pawls 66L and 66R respectively. When the actuating lever 52R (or 52L) is brought back, its pawl 66R (or 66L) engages the inclined face *e* of the hooked piece 61R (or 61L), forcing the locking lever 60 to the left against the spring 65 and when the pawl 66R (or 66L) has run past the face *e* of the hooked piece 61R (or 61L), the locking lever 60 is returned by the spring 65 to the right. Accordingly, removing the pressure pushing back the actuating lever 52R (or 52L) under such conditions, the pawl 66R (or 66L) gets into engagement with the face *f* of the hooked piece 61R (or 61L), with the result that the actuating lever 52R (or 52L) is locked at a backwardly biased position. Under such conditions, the arm 31R (or 31L) is rotated clockwise by the actuating piece *b* of the lever 52R (or 52L) through the arm 34R (or 34L) and the spring 35R (or 35L) against the spring 57R (or 57L), by which the pinch roller 28R (or 28L) is brought into rotary contact with the capstan 22R (or 22L) and the sliding plate 40 is pushed back by the actuating piece *c* of the lever 52R (or 52L) to bring the magnetic head 44 to its rearwardly biased position together with the sliding plate 40.

Further, there is provided on the chassis 21 along the central line L—L another actuating lever 70 in a manner to be slidable back and forth. The rear free end of the actuating lever 70 has a pawl 71 engageable with the inclined face *g* of the aforementioned engaging piece 62 of the locking lever 60, so that when the actuating lever 52R (or 52L) is locked in its backward biased position) and the lever 70 is pushed back, the locking lever 60 is slid to the left against the spring 65 by the cooperation of the pawl 71 with the inclined face *g*. As a result of this, the pawl 66R (or 66L) of the actuating lever 52R (or 52L) becomes disengaged from the face *f* of the hooked piece 61R (or 61L) to return the actuating lever 52R (or 52L) to its initial position, by which the pinch roller 28R (or 28L) disengages from the capstan 22R (or 22L) and the magnetic head 41 is brought back to its forward biased position. Removing the force pushing back the actuating lever 70 after the actuating lever 52R (or 52L) has been unlocked as above described, the lever 70 is returned to its original position by the cooperation of its pawl 71 with the inclined face *g* of the engaging piece 62. Reference numeral 72 indicates an elongated guide hole formed in the actuating lever 70, in which the pin 43 loosely inserted in the elongated hole 42 of the aforesaid sliding plate 40 is loosely inserted.

Figure 3:
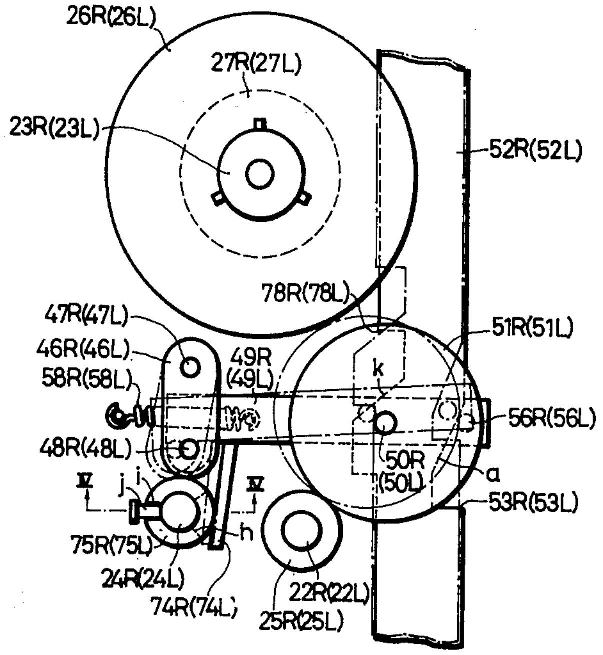
FIG. 3 is an enlarged plan view of one portion of the cassette tape deck of this invention.
Figure 4:
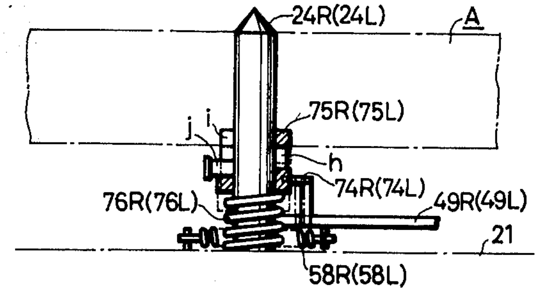
FIG. 4 is a side view of one portion of the cassette tape deck partly in section on the line IV—IV in FIG. 3.

As will be seen from FIGS. 3 and 4, the arms 49L and 49R, on which the idlers 51L and 51R are mounted, have attached thereto engaging pieces 74L and 74R extending toward the guide pins 24L and 24R respectively. While, the guide pins 24L and 24R have mounted thereon, for example, ring-shaped sliding members 75L and 75R respectively in a manner to be slidable in their axial direction. In this case, the sliding members 75L and 75R have formed therein apertures or grooves, in the illustrated example, apertures *h* from the left and right peripheral surfaces thereof in directions perpendicular to the axes of the pins 24L and 24R respectively and the right and left sides of the sliding members 75L and 75R have formed therein elongated holes *i* respectively, into which pins *j* extending radially of the pins 24L and 24R are loosely inserted. Further, coiled springs 76L and 76R are wound on the pins 24L and 24R between the lower end faces of the sliding members 75L and 75R and the chassis 21 respectively, so that the sliding members 75L and 75R are biased upwardly. The aforementioned engaging pieces 74L and 74R are adapted to be engaged with or opposite to the left peripheral surface of the sliding member 75L and that of the other 75R held at their upward biased positions respectively. Accordingly, when the cassette A is loaded in position with the guide pins 24L and 24R being inserted in the guide pin receiving holes 13L and 13R respectively, the sliding members 75L and 75R lower against the springs 76L and 76R. Consequently, when the actuating lever 52R (or 52L) has been locked by the locking lever 60 at its backward biased position, the pin 56R (or 56L) lies opposite to the notch 53R (or 53L) and the engaging piece 74R (or 74L) lies at the height of the aperture *h*. While, since the arm 49R (or 49L) is held biased by the spring 58R (or 58L) to the left (or to the right), the pin 56R (or 56L) falls into the notch 53R (or 53L) and the engaging piece 74R (or 74L) moves into the aperture *h*. As a result, the arm 49R (or 49L) is shifted to the left (or to the right) to bring the idler 51R (or 51L) into rotary contact with the wheels 25R and 26R (or 25L and 26L) to drive the wheel 26R (or 26L).

A pair of brake members 75L and 75R at the backward portion on the sliding plate 40, which are adapted to be pressed against the wheels 26L and 26R respectively to brake them when the sliding plate 40 lies in its forward biased position. When the sliding plate 40 has been slid back as above described, these brake members 75L and 75R are held disengaged from the wheels 26L and 26R respectively. Further, a lateral lever 76, which is slidable to the right and left, is disposed on the chassis 21 across the central line L—L at right angles thereto and brake members 77L and 77R for back tension for the wheels 26L and 26R are attached to the lateral lever 76. While, the right side of the lever 52L and the left side of the lever 52R have formed therein notches 78L and 78R each having an inclined face *k*. The brake members 77L and 77R are normally held apart from the wheels 26L and 26R respectively but when the actuating lever 52R (or 52L) is locked in its backward slid position as previously described, the right-hand end (left-hand end) of the lever 76 engages the inclined face *k* of the notch 78R (or 78L) and the lever 76 shifts to the left (or to the right). (In this case, the left-hand end (or the right-hand end) of the lever 76 lies in the notch 78L (or 78R), so that the brake member 77L (or 77R) makes contact with the wheel 26L (or 26R) to brake it for back tension. Reference numerals 79L and 79R designate elongated guide holes formed in the lateral lever 76, into which the aforesaid shafts 47L and 47R are loosely inserted respectively and these shafts 47L and 47R also serve as guide pins.

Further, engaging pieces *m* are provided at the right and left forward portions of the sliding plate 40. When the lever 52L (or 52R) is locked in its backward position as previously described, the engaging pieces *m* push back the rotary arm 34L (or 34R) for the pinch roller to bring the pinch roller 28L (or 28R) into rotary contact with the capstan 22L (or 22R). In this case, however, the positions of the faces of the engaging pieces *m* on the sides of the arms 34L and 34R on the sliding plate 40 are preselected in relation to those of the faces of the engaging pieces *b* on the sides of the arms 34L and 34R on the aforesaid levers 52L and 52R in such a manner that the contact pressure of the pinch roller 28L (or 28R) with the capstan 22L (or 22R) may be smaller than that of the pinch-roller 28R with the capstan 22R when the actuating lever 52L (52R) is locked in its backward position.

The foregoing has outlined the construction of one example of this invention. With such a construction, pushing back the actuating lever 52R (or 52L) and locking it after the cassette A has been loaded in the deck M with the capstans 22L and 22R being inserted in the capstan receiving apertures 12L and 12R, with the reel drive shafts 23L and 23R in the reel drive shaft receiving apertures 11L and 11R and with the guide pins 24L and 24R in the guide pin receiving holes 13L and 13R respectively, the magnetic head 41 makes contact with the tape 6 of the cassette A through the magnetic head receiving window 9, the pinch rollers 28R and 28L make rotary contact with the capstans 22R and 22L through the pinch roller receiving windows 8R and 8L with the tape 6 being gripped therebetween and the idler 51R (or 51L) makes rotary contact with the wheels 22R and 26R (or 22L and 26L). Accordingly, assuming that the capstans 22L and 22R rotate in the same direction, in the drawings anticlockwise, the tape 6 is transported from the reel 5L to 5R while making contact with the magnetic head 41 to record signals on the tape 6 or reproduce signals recorded thereon. In this case, since the brake member 77L (or 77R) is in contact with the wheel 26L (or 26R), back tension is applied to the tape 6 and since the contact pressure of the pinch roller 28L to the capstan 22L is smaller than that of the pinch roller 28R to the capstan 22R, back tension is similarly applied to the tape 6. Accordingly, the tape 6 is transported while being supplied with suitable, predetermined back tension.

Further, loading of the cassette A on the deck M at the predetermined position is detected by the engaging pieces 74L and 74R and, based upon this detection, the idlers 51L and 51R are brought into rotary contact with the wheels 26L and 26R to drive the reel drive shafts 23L and 23R respectively, so that when the cassette A is not loaded or when loaded but out of position, the reel drive shafts are not driven. Consequently, by providing rotation detecting means in association with the reel drive shafts or wheels coupled therewith for detecting their rotation and by driving the capstans only when the rotation of the reel drive shafts or wheels is detected, unnecessary rotation of both of the capstans and the reel drive shafts can be avoided.

Although the foregoing description has been made in connection with the case where the engaging pieces 74L and 74R for engagement with the sliding members 75L and 75R mounted on the guide pins 24L and 24R respectively are attached to the arms 49L and 49R having mounted thereon the idlers 51L and 51R respectively, the engaging pieces 74L and 74R need not always be attached to such arms 49L and 49R and, in short, they are required only to engage the sliding members 75L and 75R when the cassette A is loaded on the deck M at its predetermined position. Further, it is also possible to associate a switch with the engaging pieces and derive a signal therefrom to detect whether the cassette A hs been loaded on the deck M at the predetermined position. Of course, it is also possible to mount a sliding member on either one of the left and right guide pins.

It will be apparent that many modifications and variations may be effected without departing from the scope of the novel concepts of this invention.

I claim:

1. A cassette tape deck for use with a cassette having a magnetic tape wound on a pair of first and second reels having central apertures respectively in a casing, the casing having a first major face having formed therein at least a pair of first and second capstan receiving apertures and a pair of first and second reel drive shaft receiving apertures and a second major face having formed therein at least a magnetic head receiving window and a pair of first and second pinch roller receiving windows and substantially perpendicular to the first major face, comprising a pair of first and second capstans insertable into the first and second capstan receiving apertures; a pair of first and second pinch rollers that make rotary contact with the first and second capstans through the first and second pinch roller receiving windows; a magnetic head mounted on a sliding plate to make contact with the magnetic tape through the magnetic head receiving window; a pair of first and second reel drive shafts insertable into the first and second reel drive shaft receiving apertures; a pair of first and second actuating levers movable along first and second paths respectively, the pair of first and second actuating levers being moved in a first direction along the first and second paths respectively for bringing the first and second pinch rollers into rotary contact with the first and second capstans and for sliding the sliding plate to contact the magnetic head with the magnetic tape; a locking lever for selectively locking the first and second actuating levers at their moved positions in the first direction along the first and second paths; a third actuating lever for releasing the first and second actuating levers from their locked condition to move them along the first and second paths in a second direction reverse to the first direction; a pair of first and second wheels for coupling the first and second reel drive shafts with driving sources through a pair of first and second rotary frictional coupling means, a pair of first and second brake members mounted on the sliding plate, the pair of first and second brake members engaging the first and second wheels respectively to brake them when the sliding plate is not slid, and disengaging from the first and second wheels to release them from the braked condition when the sliding plate is slid; a movable lever adapted to be engageable with the first and second actuating levers and movable in third and fourth directions respectively along a third path; and a pair of third and fourth brake members disposed on the movable lever for engagement with the first and second wheels based upon the actuation of the second and first actuating levers respectively to apply back tension to the magnetic tape through the second and first reel drive shafts.

* * * * *